US012373969B2

(12) United States Patent
Pillans et al.

(10) Patent No.: US 12,373,969 B2
(45) Date of Patent: Jul. 29, 2025

(54) SPECULAR SURFACE MAPPING

(71) Applicant: Apple Inc., Cupertino, CA (US)

(72) Inventors: Luke A Pillans, San Diego, CA (US); Aleksandr M Movshovich, Santa Clara, CA (US); Nicholas C Soldner, Mountain View, CA (US); Daniel Kurz, Boulder, CO (US); Arthur Y Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 214 days.

(21) Appl. No.: 18/145,825

(22) Filed: Dec. 22, 2022

(65) Prior Publication Data
US 2023/0281846 A1 Sep. 7, 2023

Related U.S. Application Data

(63) Continuation of application No. 18/002,648, filed as application No. PCT/US2021/039684 on Jun. 29, 2021, now abandoned.
(Continued)

(51) Int. Cl.
*G06T 7/514* (2017.01)
*G01N 21/00* (2006.01)
(Continued)

(52) U.S. Cl.
CPC .......... *G06T 7/514* (2017.01); *G02B 27/0172* (2013.01); *G06T 17/00* (2013.01);
(Continued)

(58) Field of Classification Search
None
See application file for complete search history.

(56) References Cited

U.S. PATENT DOCUMENTS

2016/0366347 A1* 12/2016 Shin .................... H04N 5/33

FOREIGN PATENT DOCUMENTS

| AU | 2011259699 | 5/2012 |
|----|------------|--------|
| WO | 2019195551 | 10/2019 |
| WO | 2019212876 | 11/2019 |

OTHER PUBLICATIONS

International Search Report and Written Opinion for PCT/US2021/039684, date of mailing Oct. 21, 2021, pp. 1-15.
(Continued)

*Primary Examiner* — Jeffrey J Chow
(74) *Attorney, Agent, or Firm* — Alexander A. Knapp; Kowert, Hood, Munyon, Rankin & Goetzel, P.C.

(57) ABSTRACT

Methods and apparatus for specular surface mapping in which a camera detects reflections of a light source from a specular surface. The detected light sources may be projected onto a celestial sphere as virtual point sources. True positive observations should be tightly clustered on the celestial sphere; thus, false positives may be identified and removed. Specular surface information may then be determined from clusters of the virtual point sources on the celestial sphere. The clusters of virtual point sources on the celestial sphere may be identified and used to identify a surface as a specular surface. The clusters may also be used to extract other information regarding the specular surface, including but not limited to distance to and extent of the specular surface.

20 Claims, 10 Drawing Sheets

Related U.S. Application Data

(60) Provisional application No. 63/046,648, filed on Jun. 30, 2020.

(51) Int. Cl.
| | |
|---|---|
| *G02B 27/01* | (2006.01) |
| *G06T 17/00* | (2006.01) |
| *G06V 10/141* | (2022.01) |
| *G06V 10/60* | (2022.01) |
| *G06V 10/762* | (2022.01) |
| *H04N 5/74* | (2006.01) |
| *H04N 23/21* | (2023.01) |

(52) U.S. Cl.
CPC ............ *G06V 10/141* (2022.01); *G06V 10/60* (2022.01); *G06V 10/762* (2022.01); *H04N 5/74* (2013.01); *H04N 23/21* (2023.01); *G01N 21/00* (2013.01)

(56) References Cited

OTHER PUBLICATIONS

Hofer, Sebastian, et al., "Infrared deflectometry for the inspection of diffusely specular surfaces", Advanced Optical Technologies, vol. 5, No. 5-6, Jan. 1, 2016, pp. 377-387.
Sankaranarayanan, Swin C., et al., "Image Invariants for Smooth Reflective Surfaces", Advances in Intelligent Data Analysis XIX; Lecture Notes, Sep. 5, 2010, pp. 237-250.
Ihrke, Ivo, et al., "Transparent and Specular Object Reconstructions", Journal of the European Association for Computer Graphics, vol. 29, No. 8, Nov. 10, 2010, pp. 2400-2426.
Extended Search Report from European Patent Application No. 23172585.4, date of mailing Nov. 8, 2023, pp. 1-12.

\* cited by examiner

SPECULAR SURFACE MAPPING

This application is a continuation of U.S. patent application Ser. No. 18/002,648, filed Dec. 20, 2022, which is a 371 of PCT Application No. PCT/US2021/039684, filed Jun. 29, 2021, which claims benefit of priority to U.S. Provisional Patent Application No. 63/046,648, filed Jun. 30, 2020. The above applications are incorporated herein by their reference. To the extent that any material in the incorporated application conflicts with material expressly set forth herein, the material expressly set forth herein controls.

BACKGROUND

Specular mapping, or specular surface mapping, is a method used in computer graphics to define the shape of shiny or reflective areas on a surface, or of shiny or reflective surfaces in an environment. For example, a surface may include specular and non-specular portions, and a specular map can be generated using specular mapping techniques and applied to define only the specular portions of the surface as shiny or reflective. As another example, a room may include non-specular surfaces and objects as well as specular surfaces and objects such as mirrors, windows, and glass table tops. A specular mapping technique may be used to generate a specular surface map for the room that defines the specular surfaces in the room.

SUMMARY

Various embodiments of methods and apparatus for identifying and mapping specular surfaces such as mirrors and window glass are described. Embodiments of specular surface mapping methods may exploit a property of highly specular surfaces including glass and mirrors whereby 850 nm or similar wavelength NIR light strongly reflects at nearly perfectly orthogonal angles, and follows a spatio-temporal or amplitude distribution as the viewing angle of a surface or object changes. Embodiments may implement signal processing techniques that leverage the physical properties of NIR light's interaction with specular surfaces to detect glass, mirrors and other highly reflective surfaces in an environment, as well as to classify materials.

In embodiments, a NIR light source (e.g., an array of NIR LEDs, also referred to as an NIR dot projector) projects an NIR dot pattern into the environment. A NIR camera makes observations of the NIR light source reflected in surfaces such as glass or mirrors. The NIR light source may be located on a device (e.g., a head-mounted device (HMD) or hand-held device such as a mobile multipurpose device (e.g., smartphone, or tablet)), close to the NIR camera. A specular surface mapping method takes advantage of the fact that the vector to the reflection of the NIR light source will be constant relative to the reflective surface (and normal to the reflective surface, if the NIR light source and NIR camera are coincident). The observed reflection of the NIR light source may be identified as a virtual point source and projected onto a celestial sphere (e.g., in a SLAM (simultaneous localization and mapping) model). The point on the sphere can be treated like a "guide star" and becomes stationary, regardless of translation or rotation of the device.

Projecting the virtual point source onto a celestial sphere allows results (e.g., multiple observations) to be aggregated. Clusters of virtual point sources on the celestial sphere may be identified and used to identify a surface as a specular surface (e.g., glass or mirror). The clusters of virtual point sources on the celestial sphere may also be used to extract other information regarding the specular surface, including but not limited to distance to and extent of the specular surface.

Clustering of the virtual point sources on the celestial sphere may be used to filter out false positives. True positive observations of the NIR light source should be tightly clustered on the celestial sphere. False positives should be randomly distributed and thus can be filtered out.

In some embodiments, extent and distance of specular surfaces may be determined by observations of reflections of the NIR light source. The reflection of the NIR light source is visible in a volume projected perpendicular from the specular surface into the environment (e.g., room) when the normal to the specular surface is within the field of view of the NIR camera. Any observations of the reflection within this volume fall on the same location on the celestial sphere, but at different locations within the mapping volume. Correlating clustered points on the celestial sphere with their locations in the mapping volume may be used to infer the extent of the reflective plane (the specular surface). In some embodiments, the distance to the observed reflections may also be used to determine the distance of the specular surface. In some embodiments, instead or in addition, the extent and distance of the specular surface may be inferred from observations of a frame of the specular surface.

While embodiments are generally described that use near-infrared (NIR) light sources, some embodiments may use light sources in other wavelengths, such as infrared (IR), short-wave infrared (SWIR), mid-wave infrared (MWIR), long-wave infrared (LWIR), and wavelengths in the visible portion of spectrum.

An example application of the specular surface mapping methods and apparatus as described herein is in handheld devices such as smartphone, pad, or tablet devices. Using embodiments, the device may be moved by the user to identify, map, and classify specular surfaces in an environment such as a room. This information may, for example, be integrated into 3D mapping information generated by the device. Another example application of the specular surface mapping methods is in head-mounted device (HMDs)) such as those used in extended reality (XR) systems that include an opaque user-facing display on which XR content is displayed for viewing by the user. By identifying and mapping specular surfaces in an environment such as a room, embodiments may provide improved safety for wearers of HMDs, for example by informing the wearers of the presence of a glass door, mirror, or window, which in conventional HMD 3D mapping systems may be wrongly identified as an open space in a wall.

Figure 1:
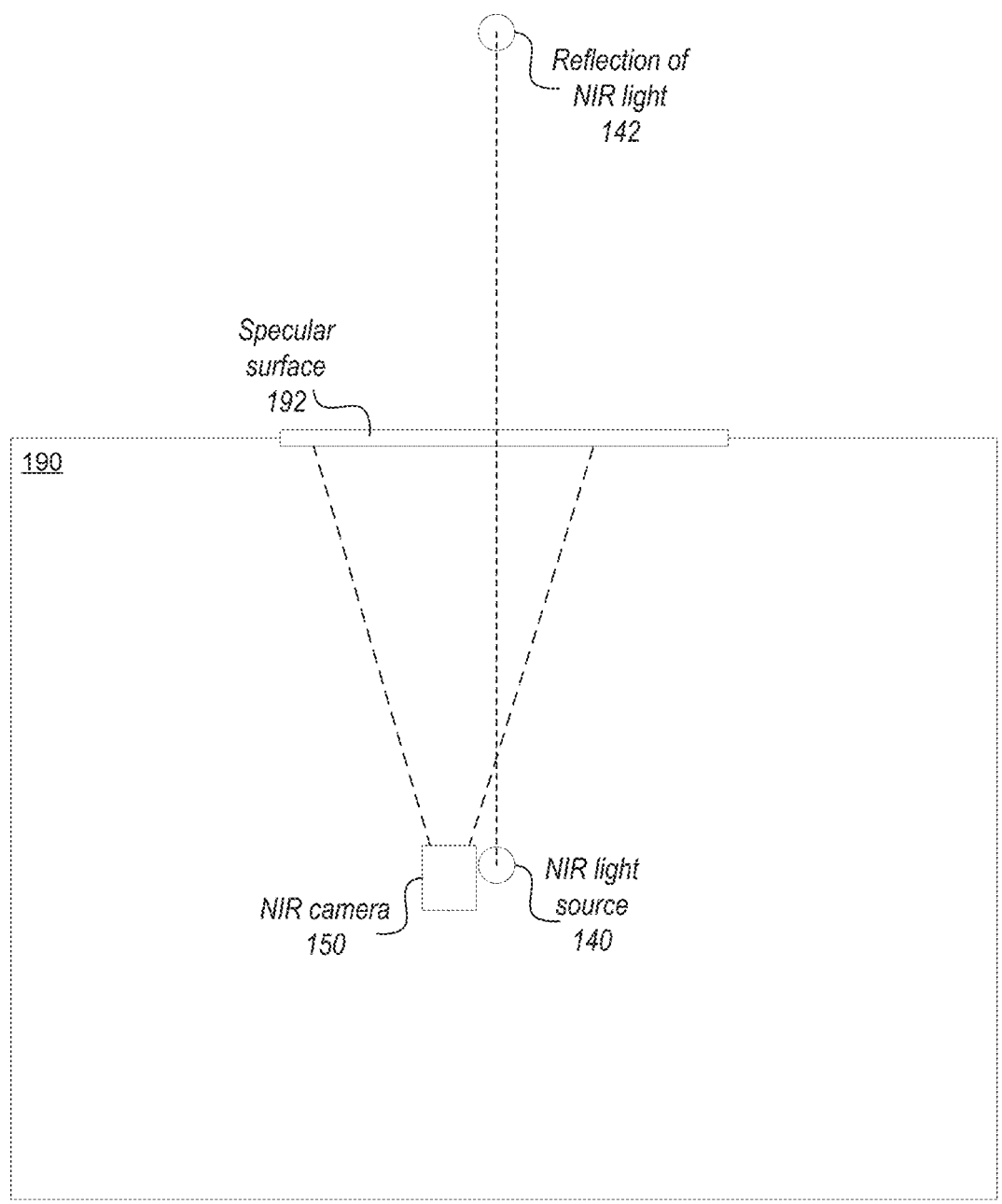
FIG. 1 illustrates a point near-infrared (NIR) light source reflecting from a specular surface to a NIR camera, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for identifying and mapping specular surfaces such as mirrors and window glass are described. Various devices including but not limited to head-mounted devices (HMDs) and hand-held devices may include sensor technology and software used to generate three-dimensional (3D) mappings of environments such as rooms; the 3D mappings may be used in various applications including but not limited to extended reality (XR) applications. Automatic and semi-automatic 3D mapping of the environment is typically performed using a combination of near-infrared (NIR) light sources and depth cameras and visible light cameras using computer vision algorithms to segment objects, planes and depth to reconstruct the surroundings.

However, the detection of glass (e.g., windows and glass doors, glass tables, glass room partitions, etc.), mirrors, and other highly specular surfaces is challenging using conventional visible light cameras and depth cameras and 3D mapping methods. Glass is typically very transmissive of NIR light (~850 nm) projected by structured light depth cameras, and mirrors confuse depth measurements due to their highly reflective nature. Light from a NIR depth camera either does not reflect or is reflected away from the NIR camera.

Embodiments of the methods and apparatus for specular surface mapping as described herein may exploit a property of highly specular surfaces including glass and mirrors whereby 850 nm or similar wavelength NIR light strongly reflects at nearly perfectly orthogonal angles, and follows a spatio-temporal or amplitude distribution as the viewing angle of a surface or object changes. Embodiments may implement signal processing techniques that leverage the physical properties of NIR light's interaction with highly specular surfaces to detect glass, mirrors and other highly reflective surfaces in an environment, as well as to classify materials.

While embodiments are generally described that use near-infrared (NIR) light sources, some embodiments may use light sources in other wavelengths, such as infrared (IR), short-wave infrared (SWIR), mid-wave infrared (MWIR), long-wave infrared (LWIR), and wavelengths in the visible portion of spectrum.

In some embodiments, a NIR light source (e.g., an array of NIR LEDs, also referred to as an NIR dot projector) that projects an NIR dot pattern into the environment may be located close to a NIR camera. As the fixed NIR dot pattern moves away at orthogonal angles, different materials provide unique responses and reflectivity detectable in the time-variant amplitude across the fixed dot pattern as the device moves relative to the environment. On the device (e.g., an HMD or hand-held device), pose of the device may be immediately measured and predicted, providing a frame of reference for the NIR dot pattern which is fixed and moves rigidly with the device.

In embodiments, a method of mapping reflective surfaces involves making observations of the NIR light source (e.g., a NIR dot projector) that may be reflected in surfaces such as glass and mirrors. The NIR light source may be located on a device (e.g., an HMD or hand-held device), close to a NIR camera. The method takes advantage of the fact that the vector to the reflection of the NIR light source will be constant relative to the reflective surface (and normal to the reflective surface, if the NIR light source and NIR camera are coincident). The observed reflection of the NIR light source may be identified as a virtual point source and projected onto a celestial sphere. If the observation were to be simply treated as a reflection, this virtual point source will translate with translation of the device. However, if the virtual point source is moved to infinity by projecting the virtual point source onto a celestial sphere (e.g., in a SLAM (simultaneous localization and mapping) model), the point on the sphere can be treated like a "guide star" and becomes stationary, regardless of translation or rotation of the device.

Projecting the virtual point source onto a celestial sphere may allow results (e.g., multiple observations) to be aggregated. Clusters of virtual point sources on the celestial sphere may be identified and used to identify a surface as a specular surface (e.g., glass or mirror). The clusters of point sources on the celestial sphere may also be used to extract other information regarding the specular surface, including but not limited to distance to and extent of the specular surface.

Clustering of the virtual point sources on the celestial sphere may be used to filter out false positives (e.g., detected reflections from sources other than the NIR light source, the sun or solar glints seen through a window, other point sources within the mapping volume, etc.). True positive observations of the NIR light source should be tightly clustered on the celestial sphere. False positives should be randomly distributed and thus can be filtered out. In some embodiments, one or more other techniques may instead or also be used to detect false positive light sources. These techniques may include, but are not limited to:

Comparing images captured by the NIR camera to visible band images captured by another camera on the device. If the light source appears in the visible band images, it is not the NIR light source.

The NIR light source may be turned off and on. If the light source remains when the NIR light source is off, it is not the NIR light source.

In some embodiments, extent and distance of specular surfaces may be determined by observations of reflections of the NIR light source. The reflection of the NIR light source is visible in a volume projected perpendicular from the specular surface into the environment (e.g., room) when the normal to the specular surface is within the field of view of the NIR camera. Any observations of the reflection within this volume fall on the same location on the celestial sphere, but at different locations within the mapping volume. Correlating clustered points on the celestial sphere with their locations in the mapping volume may be used to infer the extent of the reflective plane (the specular surface). In some embodiments, the distance to the observed reflections may also be used to determine the distance of the specular surface. In some embodiments, instead or in addition, the extent and distance of the specular surface may be inferred from observations of a frame of the specular surface (e.g., a window frame, mirror frame, or door frame).

In some embodiments, one or more additional dedicated NIR light sources may be used. For example, an additional NIR light source may be a wider-beam and/or brighter NIR light source that is independently controlled from the NIR dot projector or time of flight (TOF) illuminator.

In some embodiments, one or more methods may be used to increase the field of view (FOV) of the NIR camera used in specular surface mapping. For example, in some embodiments, an IR filter may be removed or disabled for a visible light camera of the device. The visible light camera may then be used in combination with the NIR camera to look for reflection of the NIR light source to provide a wider FOV for the specular surface mapping system. In some embodiments, a dedicated wide FOV sensor may be used to provide a wider FOV without modifying the visible light camera; a narrow passband filter may be used to increase contrast between the NIR light source and ambient light.

In some embodiments, the NIR dot pattern projected by the NIR light source may be used to distinguish specular from non-specular surfaces, and may also be leveraged to determine one or more characteristics (e.g., the material or type) of a surface. As the fixed NIR dot pattern moves away at orthogonal angles, different materials provide unique responses and reflectivity detectable in the time-variant amplitude across the fixed dot pattern as the device moves relative to the environment. On the device (e.g., an HMD or hand-held device), pose of the device may be immediately measured and predicted, providing a frame of reference for the NIR dot pattern which is fixed and moves rigidly with the device. The spatial and temporal distribution of amplitude across the dots gives rise to a vector which can be compared with the 3D map and pose of the device. Glass, for example, will have a "sharp" profile whereby the magnitude of reflection is very strong for one orthogonal dot, while adjacent dots have little signal. The profiles of other specular (and non-specular) surfaces (e.g., mirrors, polished surfaces, glossy white walls, etc.) will exhibit a range of different profiles that may be used to classify the type of surface currently being observed.

While embodiments are generally described that use an NIR dot projector as a structured NIR light source, embodiments may also be implemented that use a dedicated NIR flood illuminator, rather than a dot projector, as the NIR light source, or that use a combination of two or more different NIR light sources.

Figure 8A:
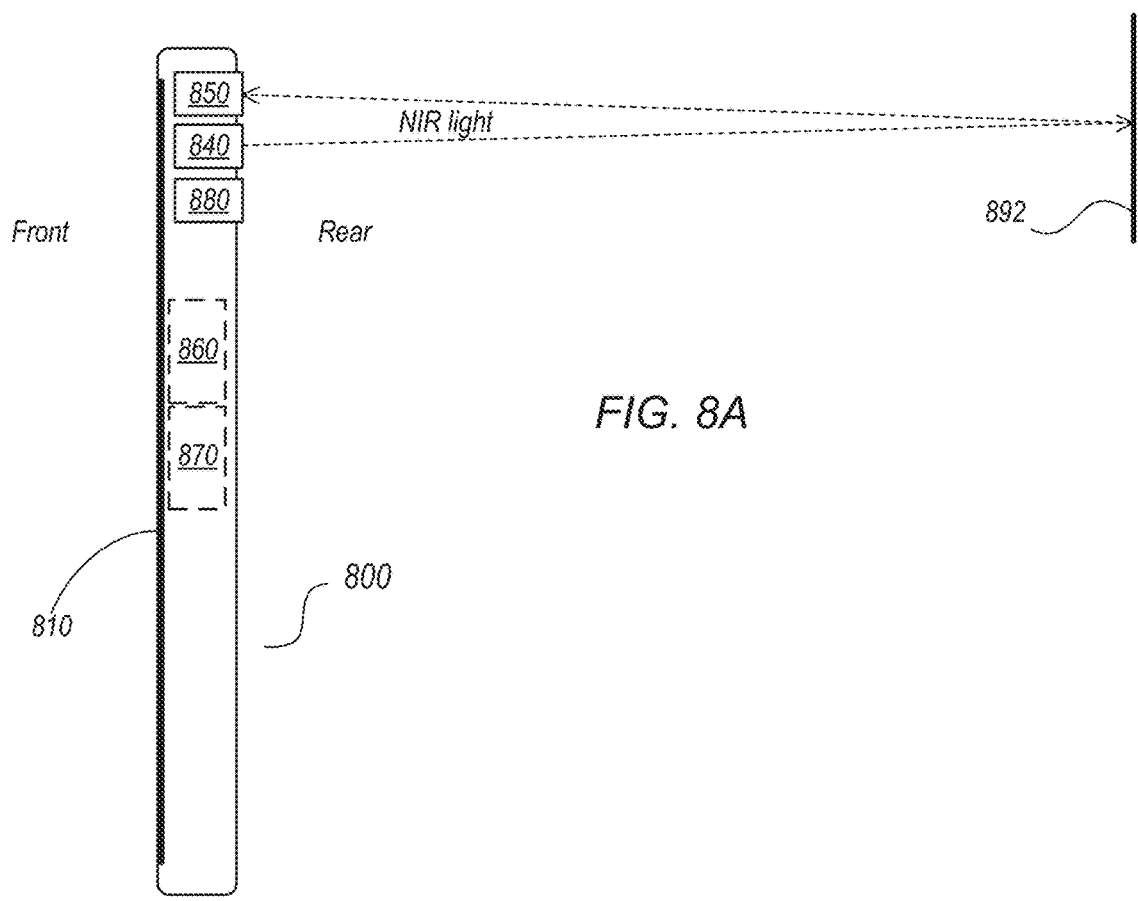
FIGS. 8A and 8B are block diagrams illustrating a device that may include a specular surface mapping mechanism, according to some embodiments.
Figure 8B:
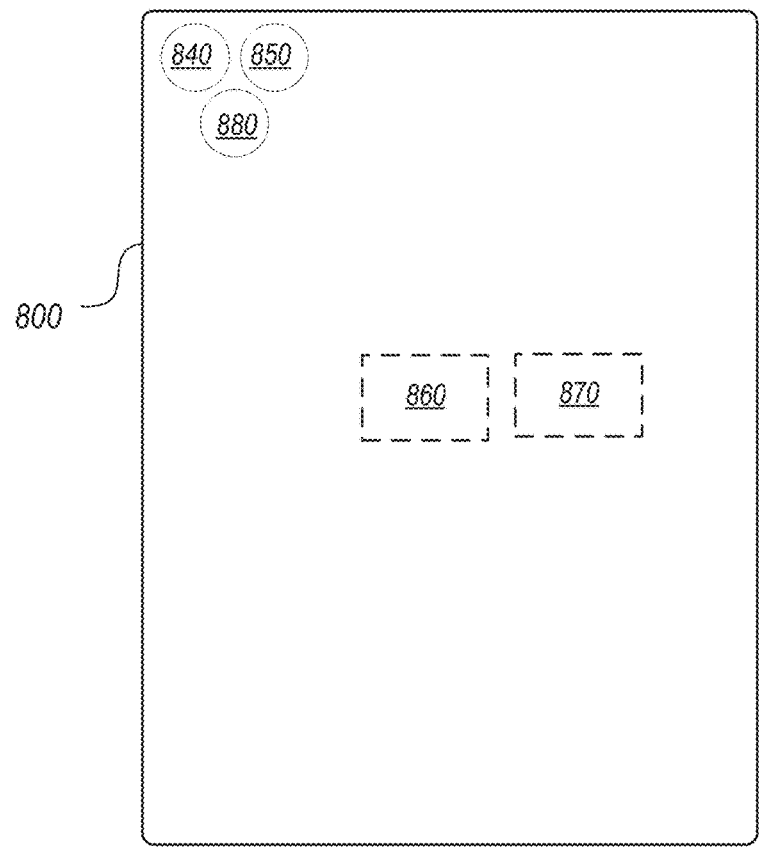

An example application of the methods and apparatus for specular surface mapping as described herein is in handheld devices such as smartphone, pad, or tablet devices. The specular surface mapping components (NIR camera, NIR light source, etc.) may be attached to or integrated in the device, and the device may be moved by the user to identify, map, and classify specular surfaces in an environment such as a room. This information may, for example, be integrated into 3D mapping information generated by other components of the device. FIGS. 8A and 8B illustrate a handheld device that may include a specular surface mapping mechanism, according to some embodiments.

Figure 9A:
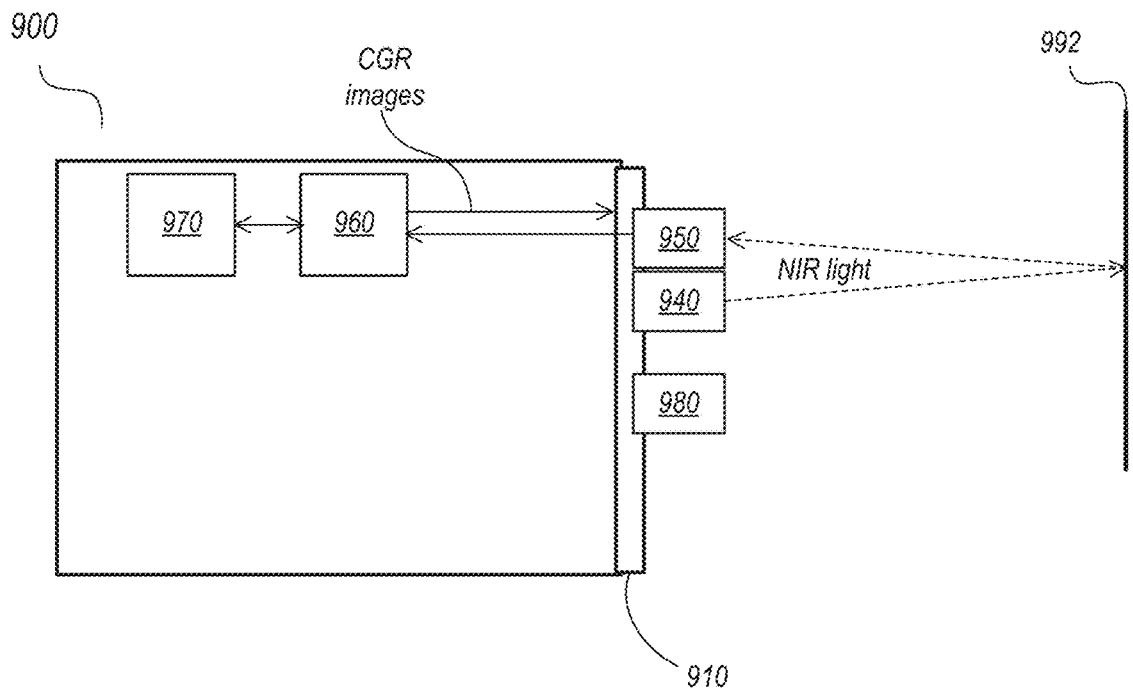
FIGS. 9A and 9B are block diagrams illustrating another device that may include a specular surface mapping mechanism, according to some embodiments.
Figure 9B:
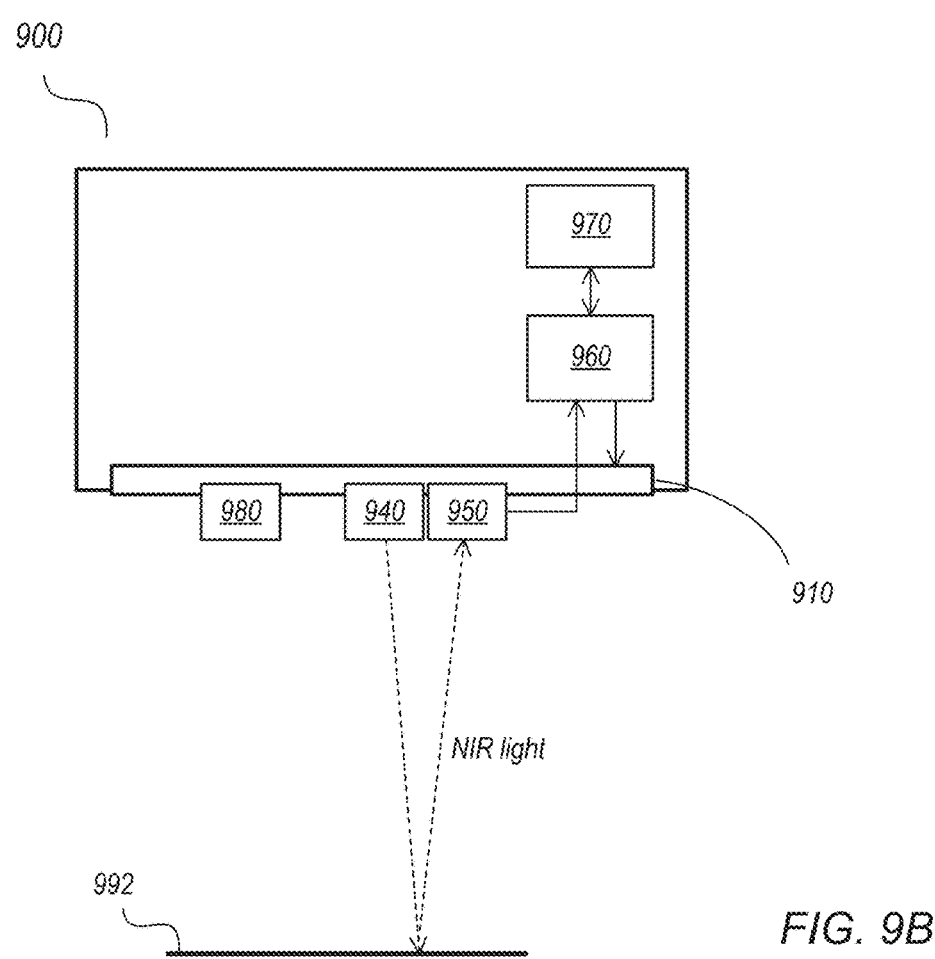

Another example application of the methods and apparatus for specular surface mapping as described herein is in extended reality (XR) systems. An XR system may include a wearable device such as a headset, helmet, goggles, or glasses (referred to herein as a head-mounted device (HMD)). An HMD may include an opaque user-facing display on which XR content is displayed for viewing by the user. Alternatively, a head mounted system may be configured to accept an external opaque display (e.g., a smartphone). An HMD may completely obstruct the normal vision of a user in XR sessions, thus requiring the HMD to be aware of the surroundings and to provide the user with a warning if coming too close to an obstruction. However, as previously mentioned, conventional 3D mapping systems struggle in identifying highly specular surfaces such as mirrors, glass doors, and window glass. Embodiments of the specular surface mapping methods and apparatus implemented on the HMD may be used to identify and map the extent of these specular surfaces; this information may be integrated into the 3D mapping generated by other components of the HMD. By identifying and mapping specular surfaces in an environment such as a room, embodiments may provide improved safety for wearers of HMDs, for example by informing the wearers of the presence of a glass door, mirror, or window, which in conventional HMD 3D mapping systems may be wrongly identified as an open space in a wall. FIGS. 9A and 9B illustrate an example HMD 700 that may include a specular surface mapping mechanism, according to some embodiments.

A physical environment refers to a physical world that someone may interact with and/or sense without the use of electronic devices. The physical environment may include physical features such as a physical object or physical surface. For example, a physical environment may include a physical city that includes physical buildings, physical streets, physical trees, and physical people. People may directly interact with and/or sense the physical environment through, for example, touch, sight, taste, hearing, and smell. An extended reality (XR) environment, on the other hand, refers to a wholly or partially simulated environment that someone may interact with and/or sense using an electronic device. For example, an XR environment may include virtual reality (VR) content, augmented reality (AR) content, mixed reality (MR) content, or the like. Using an XR system, a portion of a person's physical motions, or representations thereof, may be tracked. In response, one or more characteristics of a virtual object simulated in the XR environment may be adjusted such that it adheres to one or more laws of physics. For example, the XR system may detect a user's movement and, in response, adjust graphical and auditory content presented to the user in a way similar to how views and sounds would change in a physical environment. In another example, the XR system may detect movement of an electronic device presenting an XR environment (e.g., a laptop, a mobile phone, a tablet, or the like) and, in response, adjust graphical and auditory content presented to the user in a way similar to how views and sounds would change in a physical environment. In some situations, the XR system may adjust one or more characteristics of graphical content in the XR environment responsive to a representation of a physical motion (e.g., a vocal command).

Various electronic systems enable one to interact with and/or sense XR environments. For example, projection-based systems, head-mountable systems, heads-up displays (HUDs), windows having integrated displays, vehicle windshields having integrated displays, displays designed to be placed on a user's eyes (e.g., similar to contact lenses), speaker arrays, headphones/earphones, input systems (e.g., wearable or handheld controllers with or without haptic feedback), tablets, smartphones, and desktop/laptop computers may be used. A head-mountable system may include an integrated opaque display and one or more speakers. In other examples, a head-mountable system may accept an external device having an opaque display (e.g., a smartphone). The head-mountable system may include one or more image sensors and/or one or more microphones to capture images or video and/or audio of the physical environment. In other examples, a head-mountable system may include a transparent or translucent display. A medium through which light representative of images is directed may be included within the transparent or translucent display. The display may utilize OLEDs, LEDs, uLEDs, digital light projection, laser scanning light source, liquid crystal on silicon, or any combination of these technologies. The medium may be a hologram medium, an optical combiner, an optical waveguide, an optical reflector, or a combination thereof. In some examples, the transparent or translucent display may be configured to selectively become opaque. Projection-based systems may use retinal projection technology to project graphical images onto a user's retina. Projection systems may also be configured to project virtual objects into the physical environment, for example, on a physical surface or as a hologram.

FIG. 1 illustrates a point near-infrared (NIR) light source reflecting from a specular surface to a NIR camera, according to some embodiments. In embodiments, a method of mapping reflective (specular) surfaces involves making observations of a NIR light source 140 (e.g., a NIR dot projector) that may be reflected in a specular surface 192 such as a glass window, glass door, or mirror in a room 190. The NIR light source 140 may be located on a device (e.g., an HMD or hand-held device), close to a NIR camera 150 of the device. The method takes advantage of the fact that the vector to the reflection 142 of the NIR light source 140 will be constant relative to the specular surface 192, and normal to the specular surface 192 if the NIR light source 140 and NIR camera 150 are coincident.

Figure 2:
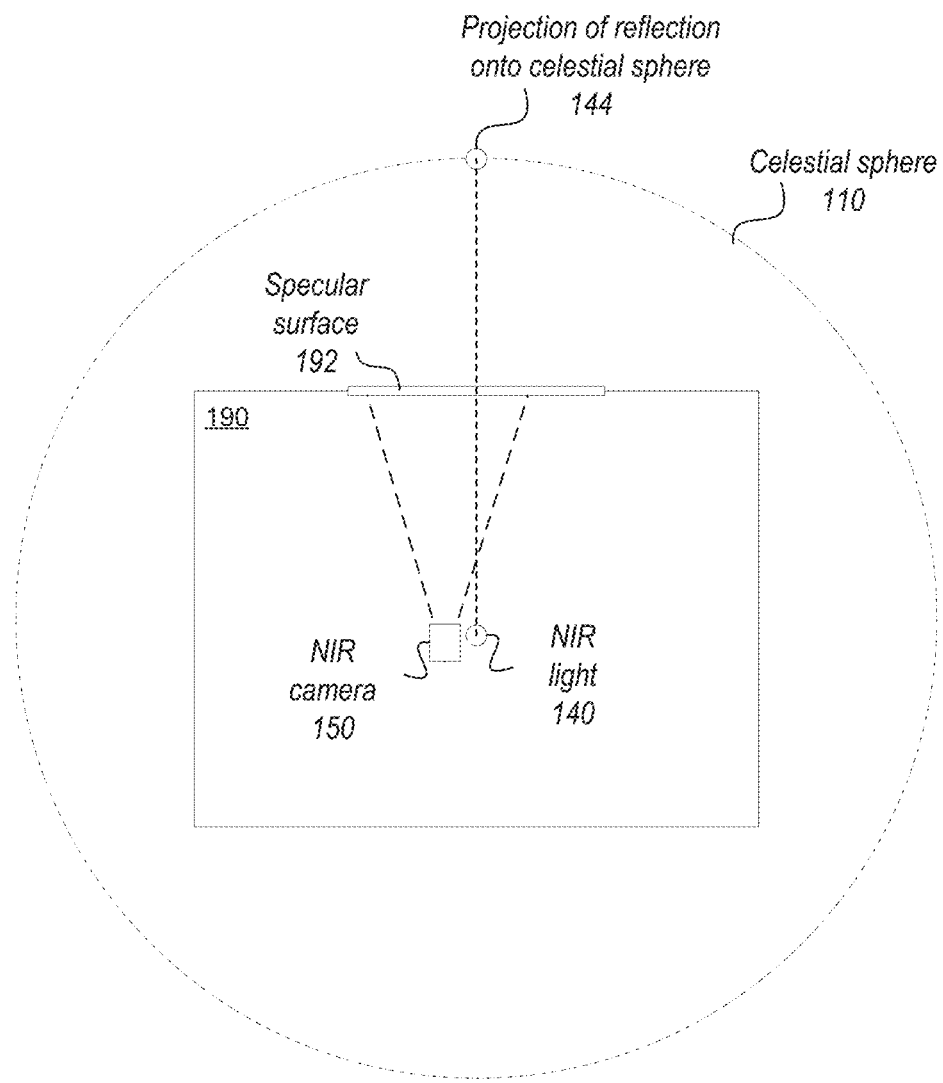
FIG. 2 illustrates projection of the NIR light reflection onto a celestial sphere, according to some embodiments.

FIG. 2 illustrates projection of the NIR light reflection 142 onto a celestial sphere, according to some embodiments. The observed reflection 142 of the NIR light source 140 may be identified as a virtual point source and projected 144 onto a celestial sphere 110. If the observation 142 were to be simply treated as a reflection, it would translate with translation of the device. However, if the observed reflection 142 is moved to infinity by projecting 144 the virtual point source onto a celestial sphere (e.g., in a SLAM (simultaneous localization and mapping) model), the point 144 on the celestial sphere 110 can be treated like a "guide star" (at infinity), and becomes stationary, regardless of translation or rotation of the device.

Figure 3:
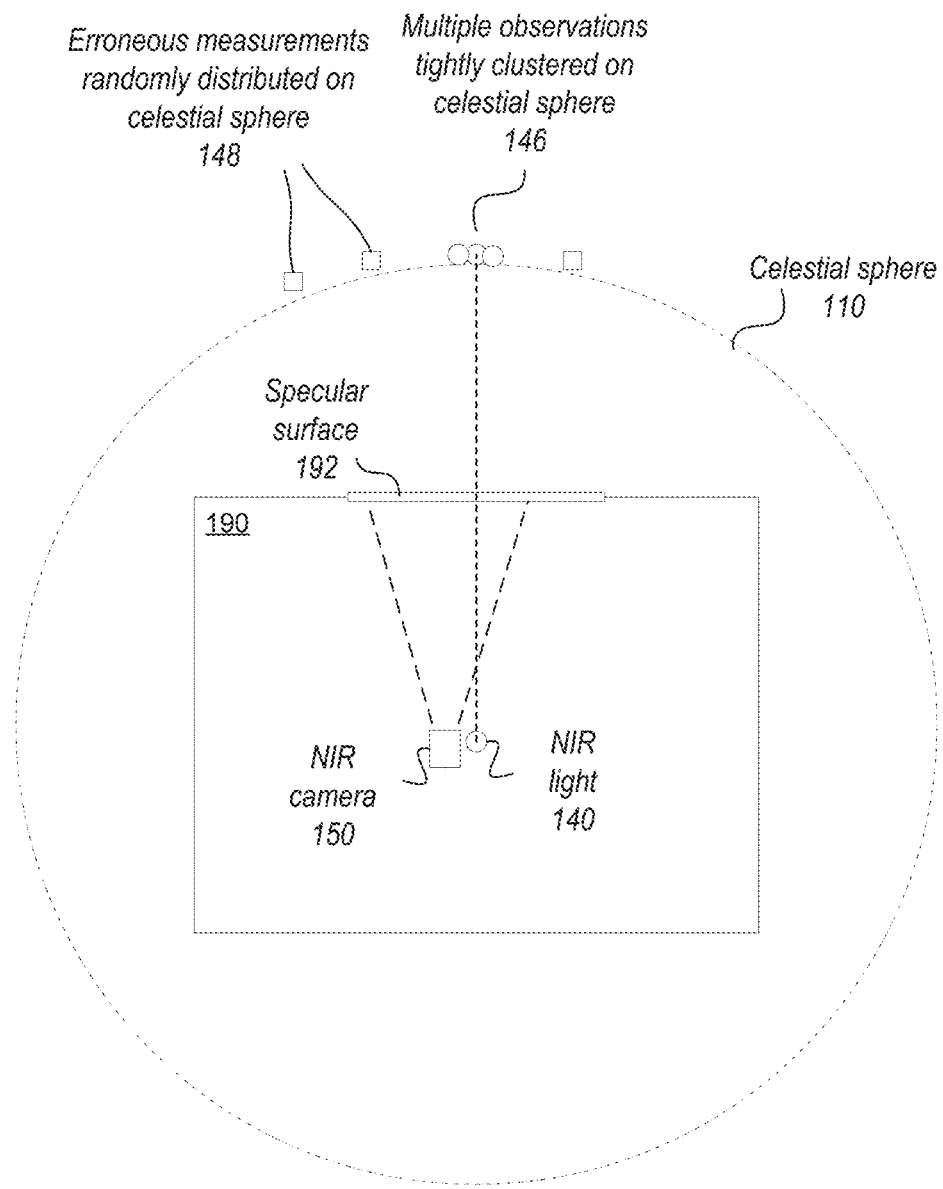
FIG. 3 illustrates clustering of NIR light reflections from a specular surface, according to some embodiments.

FIG. 3 illustrates clustering of NIR light reflections from a specular surface, according to some embodiments. The projection 144 of the virtual point source onto a celestial sphere 110 may allow results (e.g., multiple observations) to be aggregated. Clusters 146 of virtual point sources on the celestial sphere 110 may be identified and used to identify a surface as a specular surface (e.g., glass or mirror). The clusters 146 of virtual point sources on the celestial sphere 110 may also be used to extract other information regarding the specular surface 192, including but not limited to distance to and extent of the specular surface 192.

Clustering 146 of the virtual point sources on the celestial sphere 110 may be used to filter out false positives 148 (e.g., detected reflections from sources other than the NIR light source, the sun or solar glints seen through a window, other point sources within the mapping volume, etc.). True positive observations of the NIR light source should be tightly clustered 146 on the celestial sphere 110. False positives 148 should be randomly distributed and thus can be filtered out. In some embodiments, one or more other techniques may instead or also be used to detect false positive 148 light sources. These techniques may include, but are not limited to:

Comparing images captured by the NIR camera 150 to visible band images captured by another camera on the device. If the light source appears in the visible band images, it is not the NIR light source 140.

The NIR light source 140 may be turned off and on. If the detected light source remains when the NIR light source 140 is off, it is not the NIR light source 140.

Figure 4:
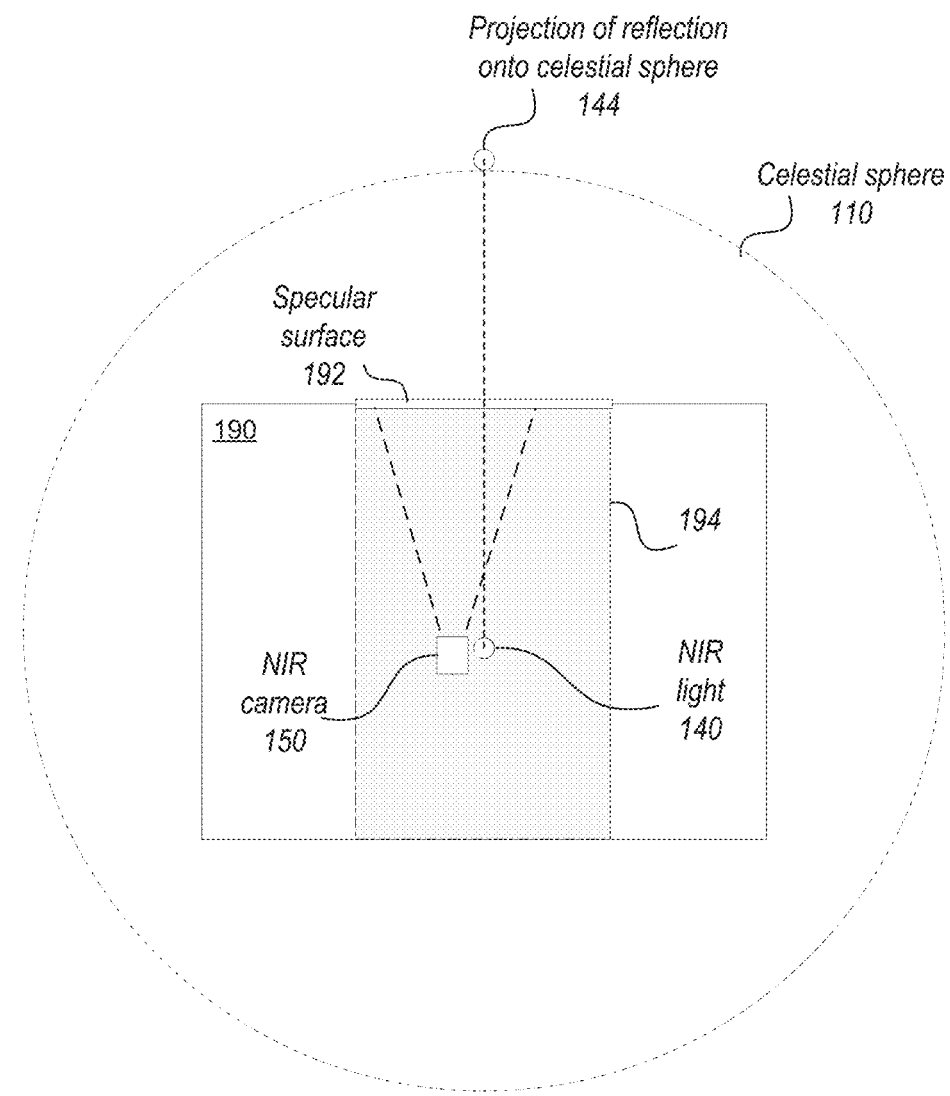
FIG. 4 illustrates a volume in which the NIR light reflections are visible to the camera, according to some embodiments.

FIG. 4 illustrates a volume 194 in which the NIR light reflections are visible to the camera, according to some embodiments. In some embodiments, extent and distance of a specular surface 192 may be determined by observations of reflections of the NIR light source 140 by the NIR camera 150. The reflection of the NIR light source 140 is visible in a volume 194 projected perpendicular from the specular surface 192 into the environment 190 (e.g., room) when the normal to the specular surface 192 is within the field of view of the NIR camera 150. Any observations of the reflection within this volume 194 fall on (or cluster at) the same location on the celestial sphere 110, but at different locations within the 3D mapping volume. Correlating clustered points on the celestial sphere 110 with their locations in the 3D mapping volume may be used to infer the extent of the reflective plane (the specular surface 192). In some embodiments, the distance to the observed reflections may also be used to determine the distance of the specular surface 192. In some embodiments, instead or in addition, the extent and distance of the specular surface 192 may be inferred from observations of a frame of the specular surface 192 (e.g., a window frame, mirror frame, or door frame).

Figure 5A:
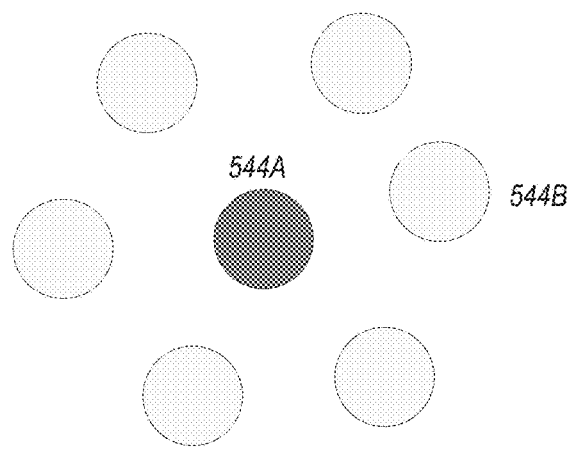
FIGS. 5A through 5E illustrate NIR projection dot patterns, according to some embodiments.
Figure 5B:
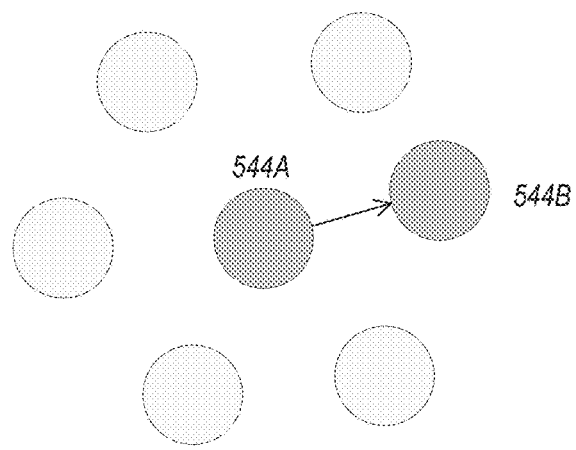
Figure 5C:
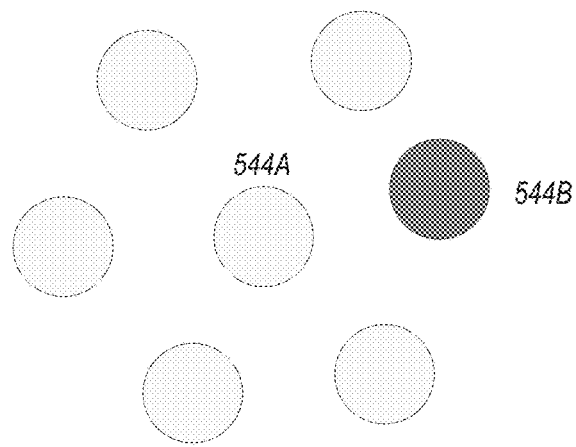

FIGS. 5A through 5E illustrate NIR projection dot patterns, according to some embodiments. In some embodiments, the NIR dot pattern projected by the NIR light source may be used to distinguish specular from non-specular surfaces, and to determine the material or type of a specular surface. The pattern of dots 544 shown in FIG. 5A through 5C represent example results when an NIR dot projector is orthogonal to a specular surface (e.g., window glass, door glass, mirror, etc.). Each dot 544 represents a fixed projection, e.g. at 850 nm. Darker shading of a dot represents amplitude of the reflection. As shown in FIG. 5A, only one dot, the orthogonal dot 544A in the center, provides a large return. As shown in FIG. 5B, as the camera moves, the amplitude of dot 544A drops, and the amplitude of another dot 544B increases. As shown in FIG. 5C, as dot 544B becomes orthogonal, the amplitude increases to maximum return amplitude.

Figure 5D:
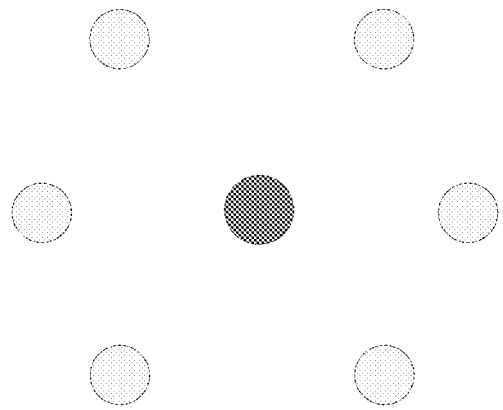
Figure 5E:
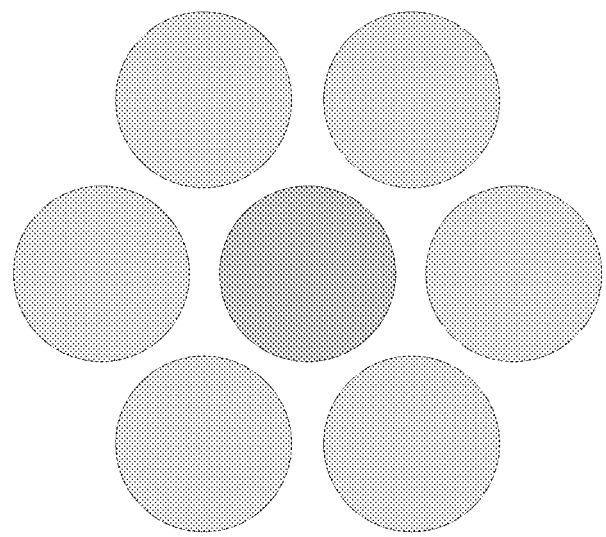

As the fixed NIR dot pattern moves away at orthogonal angles, different materials provide unique responses and reflectivity detectable in the time-variant amplitude across the fixed dot pattern as the device moves relative to the environment. On the device (e.g., an HMD or hand-held device), pose of the device may be immediately measured and predicted, providing a frame of reference for the NIR dot pattern which is fixed and moves rigidly with the device. The spatial and temporal distribution of amplitude across the dots gives rise to a vector which can be compared with the 3D map and pose of the device. Glass, for example, will have a "sharp" profile whereby the magnitude of reflection is very strong for one orthogonal dot, while adjacent dots have little signal, for example as shown in FIG. 5D. The profiles of other specular (and non-specular) surfaces (e.g., mirrors, polished surfaces, glossy white walls, etc.) will exhibit a range of different profiles that may be used to classify the type of surface currently being observed. For example, a less specular surface than glass may exhibit more diffuse (less sharp and larger) reflections with the magnitude of the reflections more evenly distributed.

Figure 6:
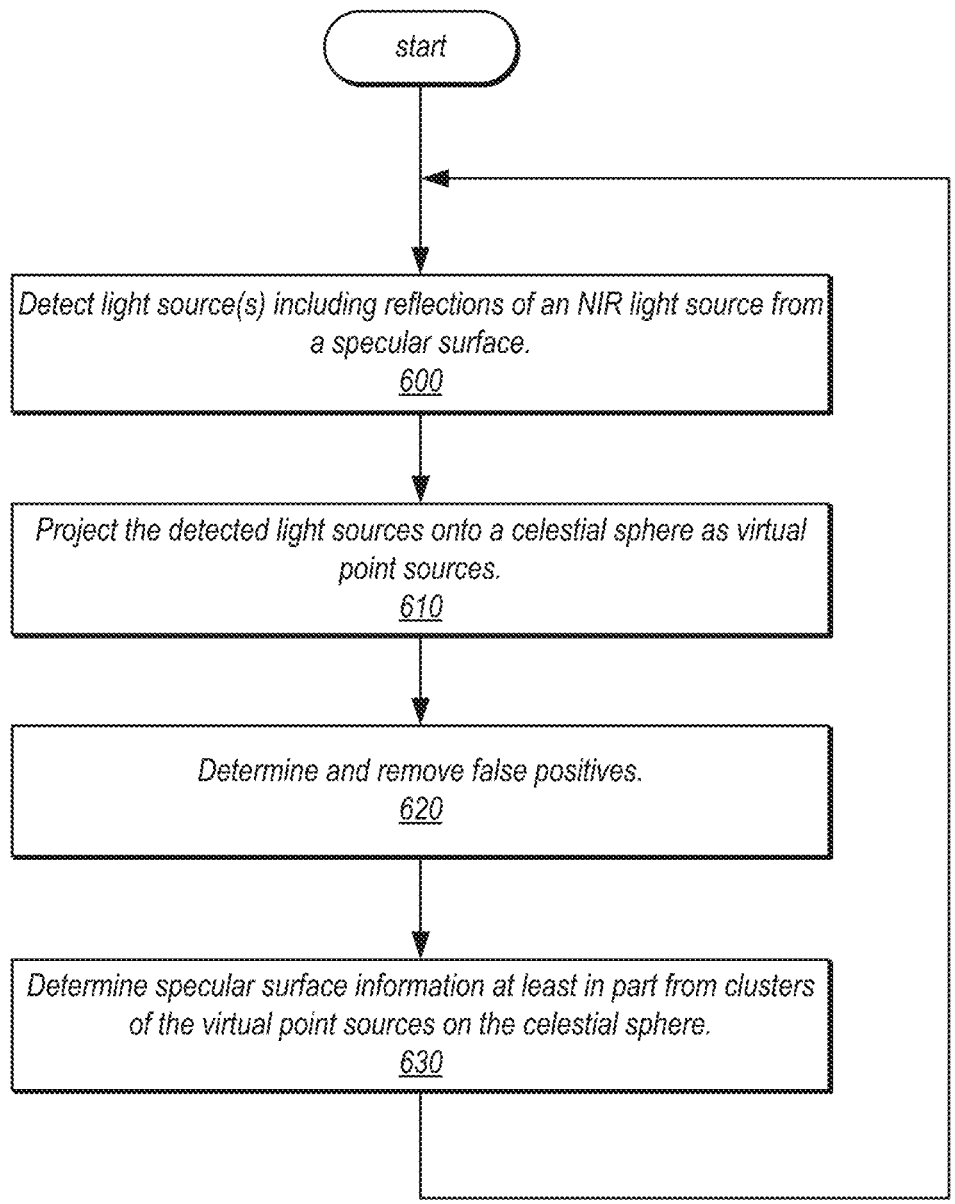
FIG. 6 is a high-level flowchart of a specular surface mapping method, according to some embodiments.

FIG. 6 is a high-level flowchart of a specular surface mapping method, according to some embodiments. As indicated at 600, a NIR camera of a device may be used to detect light source(s) including reflections of an NIR light source from a specular surface (e.g., a glass window or door, a mirror, etc.). As indicated at 610, the detected light sources may be projected onto a celestial sphere (e.g., in a SLAM (simultaneous localization and mapping) model) as virtual point sources. As indicated at 620, false positives (if any) may be identified and removed. True positive observations of the NIR light source should be tightly clustered on the celestial sphere. False positives should be randomly distributed and thus can be filtered out.

As indicated at 630, specular surface information may then be determined at least in part from clusters of the virtual point sources on the celestial sphere. Projecting the virtual point source onto a celestial sphere allows results (e.g., multiple observations) to be aggregated. Clusters of virtual point sources on the celestial sphere may be identified and used to identify a surface as a specular surface (e.g., glass or mirror). The clusters of virtual point sources on the celestial sphere may also be used to extract other information regarding the specular surface, including but not limited to distance to and extent of the specular surface.

In some embodiments, extent and distance of specular surfaces may be determined by observations of reflections of the NIR light source. The reflection of the NIR light source is visible in a volume projected perpendicular from the specular surface into the environment (e.g., room) when the normal to the specular surface is within the field of view of the NIR camera. Any observations of the reflection within this volume fall on the same location on the celestial sphere, but at different locations within the mapping volume. Correlating clustered points on the celestial sphere with their locations in the mapping volume may be used to infer the extent of the reflective plane (the specular surface). In some embodiments, the distance to the observed reflections may also be used to determine the distance of the specular surface. In some embodiments, instead or in addition, the extent and distance of the specular surface may be inferred from observations of a frame of the specular surface.

Figure 7:
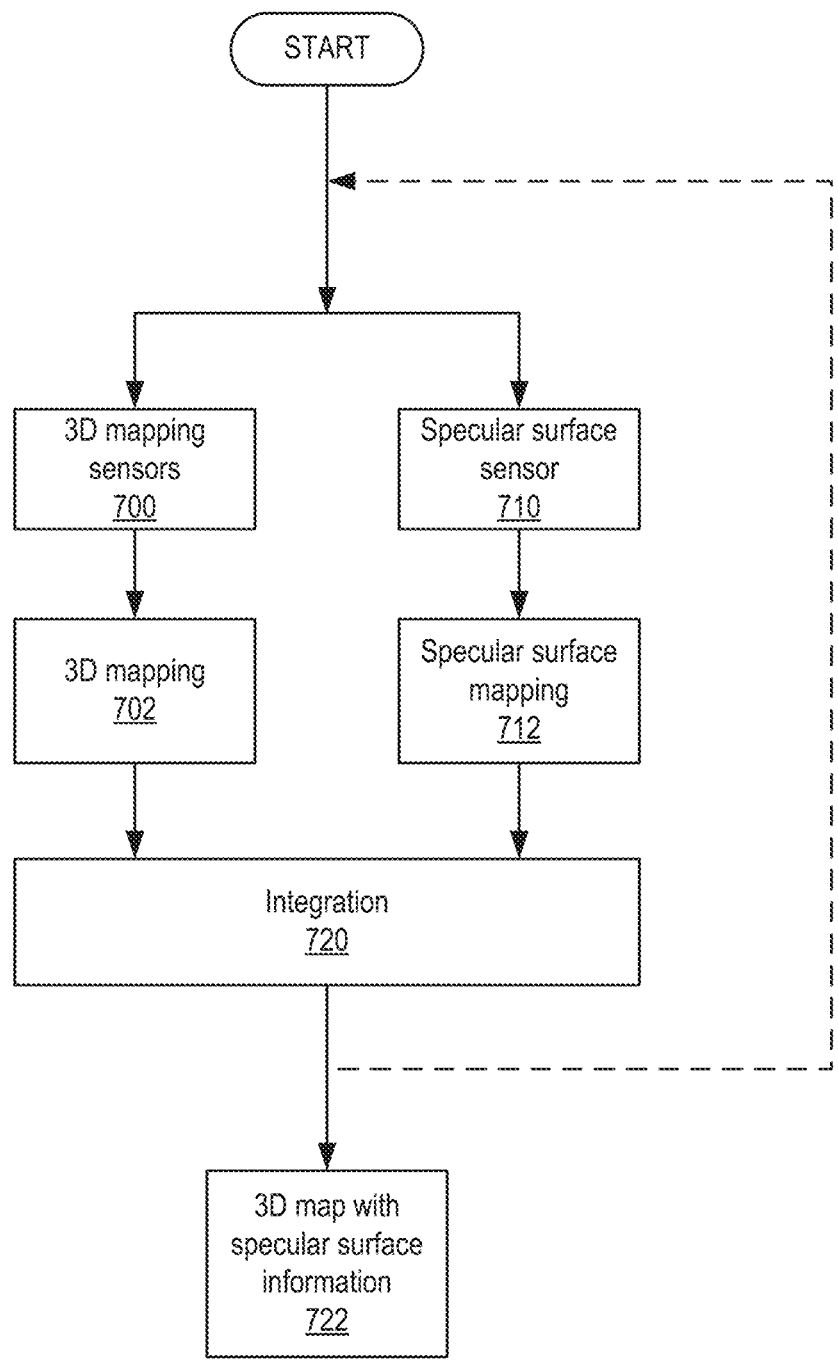
FIG. 7 is a high-level block diagram of a system for integrating specular surface information into 3D mapping of an environment, according to some embodiments.

FIG. 7 is a high-level block diagram of a system for integrating specular surface information into 3D mapping of an environment, according to some embodiments. A device may include one or more sensors 700 that collect information used to generate a 3D mapping of an environment such as a room. Automatic and semi-automatic 3D mapping 702 of the environment is typically performed using a combination of information from near-infrared (NIR) light sources and depth cameras and visible light cameras using computer vision algorithms to segment objects, planes and depth to reconstruct the surroundings. The 3D mappings may be used in various applications including but not limited to extended reality (XR) applications. However, the detection of highly specular surfaces is challenging using conventional visible light cameras and depth cameras 700 and 3D mapping 702 methods. Thus, the device may include a specular surface sensor 710 (e.g., an NIR camera) that detects reflections of a NIR light source (e.g., an array of NIR LEDs, also referred to as an NIR dot projector) in specular surfaces. Specular surface mapping 712 methods as described herein may then process the information collected by sensor 710 (e.g., by projecting the observations onto a celestial sphere, eliminating false positives, etc.) to generate specular surface information (e.g., the location, depth, extent, and/or material of a specular surface in the environment). The specular surface information may then be integrated 720 with the 3D mapping information to generate a 3D map of the environment that includes the specular surface information, e.g. the location, extent, and distance of a mirror, glass door, or window in a room.

FIGS. 8A and 8B are block diagrams illustrating a device that may implement specular surface mapping methods and apparatus as illustrated in FIGS. 1 through 7, according to some embodiments. An example application of the methods and apparatus for specular surface mapping as described herein is in a handheld device 800 such as smartphone, pad, or tablet. FIG. 8A shows a side view of an example device 800, and FIG. 8B shows an example top view of the example device 800. Device 800 may include, but is not limited to, a display screen 810 located on a "front" of the device 800, a controller 860 comprising one or more processors, memory 870, a NIR light source 840, a NIR camera 850, pose, motion, and orientation sensors (not shown), and one or more other cameras or sensing devices 880 such as visible light cameras and depth sensors. The specular surface mapping components (NIR camera 850, NIR light source 840, etc.) may be attached to or integrated in the device 800 (e.g., facing a "back" side of the device 800), and the device 800 may be moved by the user to identify, map, and classify specular surfaces 892 in an environment such as a room. This information may, for example, be integrated into 3D mapping information generated by other components of the device 800.

Note that device 800 as illustrated in FIGS. 8A and 8B is given by way of example, and is not intended to be limiting. In various embodiments, the shape, size, and other features of a device 800 may differ, and the locations, numbers, types, and other features of the components of a device 800 may vary.

FIGS. 9A and 9B are block diagrams illustrating another device that may implement specular surface mapping methods and apparatus as illustrated in FIGS. 1 through 7, according to some embodiments. FIG. 9A shows a side view of an example device 900, and FIG. 9B shows an example top view of the example device 900. Note that device 900 as illustrated in FIGS. 9A and 9B is given by way of example, and is not intended to be limiting. In various embodiments, the shape, size, and other features of a device 900 may differ, and the locations, numbers, types, and other features of the components of a device 900 may vary.

Device 900 may include a user-facing display 910. User-facing display 910 may implement any of various types of display technologies. For example, device 900 may include a display system 910 that displays left and right images on screen(s) that are viewed by a subject, such as DLP (digital light processing), LCD (liquid crystal display) and LCoS (liquid crystal on silicon) technology display systems. As another example, display system 910 may be a direct retinal projector system that scans left and right images, pixel by pixel, to the subject's eyes. To scan the images, projectors generate beams that are directed to reflective components that redirect the beams to the user's eyes. In some embodiments, device 900 may be worn on a user's head so that the display 910 is disposed in front of the user's eyes. Thus, device 900 may be an HMD with integrated display 910, or alternatively may be a head mounted system configured to accept an external opaque display (e.g., a smartphone).

Device 900 may include one or more world-facing sensors 980 that collect information about the environment (video, depth information, lighting information, etc.), and may also include one or more user-facing sensors (not shown) that collect information about the user (e.g., eye or gaze tracking sensors, video of various portions of the user's face). The user-facing sensors may include, but are not limited to one or more eye tracking cameras (e.g., infrared (IR) cameras) that capture views of the user's eyes, one or more cameras (e.g., RGB video cameras) that capture views of various portions of the user's face, and/or sensors that capture depth information for the user's face. The world-facing sensors 980 may include, but are not limited to, one or more cameras (e.g., visible light RGB video cameras) that capture images of the real world environment in a field of view in front of the device 900, and one or more ambient light sensors that capture lighting information for the environment. In some embodiments, the world-facing sensors 980 may also include sensors that capture depth information for objects and surfaces in the environment. Device 900 may also include pose, motion, and orientation sensors (not shown). Device 900 may also include specular surface mapping components (NIR camera 950, NIR light source 940, etc.) attached to or integrated in the device 900

A controller 960 may be implemented in the device 900, or alternatively may be implemented at least in part by an external device (e.g., a computing system or handheld device such as a smartphone, pad, or tablet) that is communicatively coupled to device 900 via a wired or wireless interface. Controller 960 may include one or more of various types of processors, image signal processors (ISPs), graphics processing units (GPUs), coder/decoders (codecs), system on a chip (SOC), CPUs, and/or other components for processing and rendering information captured by the world-facing sensors 980, user-facing sensors, pose, motion, and orientation sensors, and NIR camera 950. Controller 960 may, for example, be configured to generate 3D mappings of the environment based on information captured by the sensors, render frames that include virtual content based at least in part on inputs obtained from the sensors, and may provide the rendered frames to display 910.

Memory 970 may be implemented in the device 900, or alternatively may be implemented at least in part by an external device (e.g., a computing system, smartphone, etc.) that is communicatively coupled to device 900 via a wired or wireless interface. Memory 970 may, for example, be used to record information captured by the sensors, to store program instructions that are executable by the controller 960, and to store data that are used by the controller including but not limited 3D mapping information. Memory 970 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Embodiments of a device 900 as illustrated in FIGS. 9A and 9B may, for example, be used in XR applications to provide augmented or mixed reality views to the user. Device 900 may include one or more sensors that collect information about the environment (video, depth information, lighting information, specular surface information, etc.); the sensors may provide the collected information to controller 960 of the device 900. The sensors 950 may include one or more visible light cameras (e.g., RGB video cameras) that capture video of the environment that may be used to provide the user with a virtual view of their real environment. In some embodiments, video streams of the real environment captured by the visible light cameras may be processed by the controller 960 of the device 900 to render augmented or mixed reality frames that include virtual content overlaid on the view of the real environment based at least in part on generated 3D mapping information including specular surface information, and the rendered frames may be provided to display 910.

As another example, embodiments of a device 900 as illustrated in FIGS. 9A and 9B may be used in XR applications to provide virtual reality views to the user. An XR application may allow users to experience and/or interact with an immersive artificial environment, such that the user feels as if they were physically in that environment. In some embodiments, the controller 960 of the device 900 may render virtual reality frames based at least in part on generated 3D mapping information including specular surface information, and the rendered frames may be provided to display 210.

Device 900 may, for example, be a head-mounted device (HMD)) such as an HMD used in extended reality (XR) systems. An HMD may include an opaque user-facing display 910 on which XR content is displayed for viewing by the user. Alternatively, a head mounted system may be configured to accept an external opaque display (e.g., a smartphone). An HMD may completely obstruct the normal vision of a user in XR sessions, thus requiring the HMD to be aware of the surroundings and to provide the user with a warning if coming too close to an obstruction. However, conventional 3D mapping systems struggle in identifying highly specular surfaces 992 such as mirrors, glass doors, and window glass. Embodiments of the specular surface mapping methods and apparatus as described herein may be implemented on the HMD and used to identify and map the extent of these specular surfaces 992; this information may be integrated into the 3D mapping generated by other components of the HMD. By identifying and mapping specular surfaces 992 in an environment such as a room, embodiments may provide improved safety for wearers of HMDs, for example by informing the wearers of the presence of a glass door, mirror, or window, which in conventional HMD 3D mapping systems may be wrongly identified as an open space in a wall.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
a light source configured to emit light into an environment;
a camera configured to capture images that contain a plurality of instances of reflected light from the light source that have been reflected from a surface in the environment, wherein the camera is located proximate to the light source on the device; and
a controller comprising one or more processors configured to:
analyze the images captured by the camera to detect the instances of reflected light from the light source in the images;
project the detected instances of reflected light on to a celestial sphere as point sources;
detect a cluster of the point sources on the celestial sphere; and
identify the surface as a specular surface based on the detected cluster of point sources on the celestial sphere.

2. The device as recited in claim 1, wherein the light source is an array of near-infrared (NIR) light-emitting diodes (LEDs) that project an NIR dot pattern into the environment.

3. The device as recited in claim 2, wherein the controller is further configured to analyze spatial and temporal distribution of amplitude of the instances of reflected light of dots from the surface captured by the NIR camera to determine one or more characteristics of the surface.

4. The device as recited in claim 1, wherein the light source is a near-infrared (NIR) flood illuminator.

5. The device as recited in claim 1, wherein the controller is further configured to filter out false positive light sources captured in the images, where true positive observations of the reflections of the light source are tightly clustered on the celestial sphere, and false positives are randomly distributed on the celestial sphere.

6. The device as recited in claim 1, wherein the instances of reflected light from the light source are detectable by the camera in a volume projected perpendicular from the specular surface into the environment when a normal to the specular surface is within a field of view of the camera, and wherein observations of the instances of reflected light within the volume fall on a same location on the celestial sphere.

7. The device as recited in claim 6, wherein the controller is further configured to correlate the point sources in the cluster on the celestial sphere with locations of respective ones of the detected instances of reflected light in a 3D mapping volume of the environment to determine extent of the specular surface in the environment.

8. The device as recited in claim 1, wherein the celestial sphere is a SLAM (simultaneous localization and mapping) technology model.

9. The device as recited in claim 1, wherein the device further includes one or more sensors configured to captured information about the environment, wherein the controller is further configured to:
process the information captured by the one or more sensors to generate a 3D mapping of the environment; and
integrate information identifying the specular surface into the 3D mapping of the environment.

10. The device as recited in claim 1, wherein the device is a smartphone or tablet.

11. The device as recited in claim 1, wherein the device is a head-mounted device (HMD) of an extended reality (XR) system.

12. A method, comprising:
emitting, by a light source, light into an environment;
capturing, by a camera, images that contain a plurality of instances of reflected light from the light source that have been reflected from a surface in the environment;
performing, by one or more processors:

analyzing the images captured by the camera to detect the instances of reflected light from the light source in the images;

projecting the detected instances of reflected light on to a celestial sphere as point sources;

detecting a cluster of the point sources on the celestial sphere; and identifying the surface as a specular surface based on the detected cluster of point sources on the celestial sphere.

13. The method as recited in claim 12, wherein the light source is an array of near-infrared (NIR) light-emitting diodes (LEDs) that project an NIR dot pattern into the environment, the method further comprising analyzing spatial and temporal distribution of amplitude of the instances of reflected light of dots from the surface captured by the NIR camera to determine one or more characteristics of the surface.

14. The method as recited in claim 12, further comprising identifying and discarding false positive light sources captured in the images, where true positive observations of the instances of reflected light from the light source are tightly clustered on the celestial sphere, and false positives are randomly distributed on the celestial sphere.

15. The method as recited in claim 12, wherein the instances of reflected light from the light source are detectable by the camera in a volume projected perpendicular from the specular surface into the environment when a normal to the specular surface is within a field of view of the camera, and wherein observations of the instances of reflected light within the volume fall on a same location on the celestial sphere, the method further comprising correlating the point sources in the cluster on the celestial sphere with locations of respective ones of the detected reflections in a 3D mapping volume of the environment to determine extent of the specular surface in the environment.

16. The method as recited in claim 12, further comprising integrating information identifying the specular surface into a 3D mapping of the environment.

17. The method as recited in claim 12, wherein the light source, camera, and one or more processors are components of a handheld device or of a head-mounted device (HMD).

18. One or more non-transitory computer-readable storage media storing program instructions that when executed on or across one or more processors cause the one or more processors to:

analyze images captured by a camera to detect a plurality of instances of reflected light from a light source that have been reflected from a surface in an environment in the images;

project the detected instances of reflected light on to a celestial sphere as point sources;

detect a cluster of the point sources on the celestial sphere; and identify the surface as a specular surface based on the detected cluster of point sources on the celestial sphere.

19. The one or more non-transitory computer-readable storage media as recited in claim 18, wherein the light source is an array of near-infrared (NIR) light-emitting diodes (LEDs) that project an NIR dot pattern into the environment, further comprising program instructions that when executed on or across one or more processors cause the one or more processors to analyze spatial and temporal distribution of amplitude of the instances of reflected light of dots from the surface captured by the NIR camera to determine one or more characteristics of the surface.

20. The one or more non-transitory computer-readable storage media as recited in claim 18, further comprising program instructions that when executed on or across one or more processors cause the one or more processors to integrate information identifying the specular surface into a 3D mapping of the environment.

* * * * *